(12) United States Patent
Lin

(10) Patent No.: US 9,989,719 B2
(45) Date of Patent: Jun. 5, 2018

(54) OPTICAL TRANSCEIVER

(71) Applicant: OptoMedia Technology Inc., Hsinchu County (TW)

(72) Inventor: Tung-Lou Lin, Hsinchu County (TW)

(73) Assignee: NIEN-YI INDUSTRIAL CORPORATION, Taipei (TW)

( * ) Notice: Subject to any disclaimer, the term of this patent is extended or adjusted under 35 U.S.C. 154(b) by 0 days. days.

(21) Appl. No.: 15/591,083

(22) Filed: May 9, 2017

(65) Prior Publication Data
US 2017/0242205 A1    Aug. 24, 2017

Related U.S. Application Data

(62) Division of application No. 14/517,933, filed on Oct. 20, 2014, now Pat. No. 9,680,573.

(30) Foreign Application Priority Data

Aug. 7, 2014 (TW) .............................. 103127092 A

(51) Int. Cl.
*H04B 10/40* (2013.01)
*H04B 10/25* (2013.01)
*G02B 6/42* (2006.01)
*G02B 6/43* (2006.01)

(52) U.S. Cl.
CPC .......... *G02B 6/428* (2013.01); *G02B 6/4206* (2013.01); *G02B 6/4243* (2013.01); *G02B 6/4249* (2013.01); *G02B 6/4278* (2013.01); *H04B 10/2504* (2013.01); *H04B 10/40* (2013.01)

(58) Field of Classification Search
CPC .......... G02B 6/4274; G02B 6/428; G02B 6/43
See application file for complete search history.

(56) References Cited

U.S. PATENT DOCUMENTS

| 5,526,160 | A | | 6/1996 | Watanabe et al. |
| 5,535,296 | A | * | 7/1996 | Uchida ................. G02B 6/421 385/137 |
| 6,599,032 | B1 | | 7/2003 | Kurashima et al. |
| 7,515,797 | B2 | | 4/2009 | Stark et al. |
| 9,207,414 | B2 | * | 12/2015 | Lin ........................ G02B 6/423 |
| 2002/0114587 | A1 | * | 8/2002 | Golwalkar ........... G02B 6/4201 385/88 |

(Continued)

FOREIGN PATENT DOCUMENTS

CN    1273367 A    11/2000
CN    2494581 Y    6/2002

(Continued)

*Primary Examiner* — Nathan Cors
(74) *Attorney, Agent, or Firm* — Leong C. Lei

(57) ABSTRACT

An optical transceiver includes a main board, a fiber joint, a circuit board, a transfer board, metal traces, photoelectric elements, a lens set, a connection base, and an amplifier. The fiber joint is coupled to the lens set and connection base for positioning plural optical fibers. The connection base is coupled to the main board, and the circuit board is electrically connected to the main board. The transfer board is disposed between the fiber joint and circuit board. Each of the metal traces is arranged on both of two neighboring surfaces of the transfer board. The photoelectric elements are respectively coupled to metal traces on the surface of the transfer board facing the fiber joint, and axially aim to the optical fibers, respectively. The amplifier electrically connects the circuit board and the photoelectric elements via the metal traces.

19 Claims, 16 Drawing Sheets

(56) References Cited

U.S. PATENT DOCUMENTS

| | | | |
|---|---|---|---|
| 2003/0053766 A1 | 3/2003 | Cheng | |
| 2007/0237464 A1 | 10/2007 | Aronson et al. | |
| 2008/0205816 A1* | 8/2008 | Lu | G02B 6/4292 385/14 |
| 2010/0172609 A1 | 7/2010 | Rolston et al. | |
| 2011/0228473 A1* | 9/2011 | Anderson | G02B 6/4452 361/679.58 |
| 2013/0004127 A1 | 1/2013 | McColloch | |
| 2014/0029890 A1* | 1/2014 | Sun | G02B 6/422 385/14 |
| 2014/0241674 A1* | 8/2014 | Isenhour | G02B 6/4284 385/93 |
| 2015/0110499 A1* | 4/2015 | Jiang | G02B 6/4274 398/139 |
| 2016/0231514 A1* | 8/2016 | De Bruijn | G02B 6/428 |

FOREIGN PATENT DOCUMENTS

| | | |
|---|---|---|
| CN | 1735826 A | 2/2006 |
| CN | 201464672 U | 5/2010 |
| CN | 201903673 U | 7/2011 |
| CN | 102466841 A | 5/2012 |
| CN | 103257414 A | 8/2013 |
| JP | H04330788 A | 11/1992 |
| TW | 200733589 | 9/2007 |
| TW | 297786 B | 6/2008 |
| TW | 201144883 | 12/2011 |
| TW | I359575 B | 3/2012 |
| TW | M441837 U | 11/2012 |
| TW | M461794 | 9/2013 |
| TW | M493677 U | 1/2015 |

\* cited by examiner

OPTICAL TRANSCEIVER

RELATED APPLICATIONS

The present application is a Divisional Application of the U.S. application Ser. No. 14/517,933, filed Oct. 20, 2014, which claims priority to Taiwan Application Serial Number 103127092, filed Aug. 7, 2014, all of which are herein incorporated by reference.

BACKGROUND

Field of Invention

The present invention relates to an optical transceiver. More particularly, the present invention relates to an optical transceiver for performing a single-path photoelectric conversion and a multi-path photoelectric conversion.

Description of Related Art

Nowadays, optoelectronic communication technology is capable of providing rapid and bulk information transmission, which in turn causes the application of the optoelectronic communication technology to become more and more prevalent. In the applications of optoelectronic communication technology, an optical transceiver is coupled to both in-line equipment and fiber-optic equipment so as to assist the in-line equipment in utilizing the fiber circuit normally. The main function of the optical transceiver is to convert received light signals into electric signals, or to convert electric signals into light signals to perform transmitting.

For example, the optical transceiver comprises photoelectric elements (such as a laser or light emitting diode and a light detecting diode) and amplifying devices arranged thereon. The photoelectric elements and the amplifying devices are electrically connected to each other by wires through a wire bonding process or a molding process. However, when a high-speed electric signal is transmitted to the photoelectric element from the amplifying device through the wire, a voltage drop or noise interference usually occurs. As a result, quality of the electric signal exchanged between the photoelectric element and the amplifying device is affected to result in an error, thus affecting the transmission result.

For the forgoing reasons, there is a need for solving the above-mentioned inconvenience and shortcoming by providing an optical transceiver, which is also an objective that the relevant industry is eager to achieve.

SUMMARY

One objective of the present invention is to provide an optical transceiver for solving the inconvenience and shortcoming in the prior art, and to utilize two vertical surfaces or non-vertical surfaces of the transfer board (such as a ceramic plate plated with gold) to solve the difficulty in electric signal transmission and decrease the number of high-speed signal traces.

Another objective of the present invention is to provide an optical transceiver so as to increase light coupling efficiency by directly optical coupling.

Still another objective of the present invention is to provide an optical transceiver so as to improve the convenience and efficiency of assembly by utilizing passive light coupling technology.

According to one embodiment, an optical transceiver is provided. The invention provides an optical transceiver. The optical transceiver comprises a main board, a connection base, a fiber joint, a circuit board, a transfer board, a plurality of metal traces, a plurality of photoelectric elements, and two amplifiers. The main board comprises a plurality of connecting terminals. The connection base is coupled to one surface of the main board, and the connection base includes a base body; at least one fixing insert formed on a bottom of the base body for inserting on the main board; a first slot is located on a side of the base body; and a second slot is located on another side of the base body communicated with the first slot. The fiber joint is coupled to the surface of the main board and the side of the base body for positioning a plurality of optical fibers. The circuit board inserts into the second slot transversely, and is coupled to the surface of the main board, and electrically connected to the main board. The transfer board is inserted into the first slot longitudinally, and located between the fiber joint and the circuit board. The transfer board includes a first surface and a second surface adjacent to each other, and the first surface faces towards the fiber joint. The metal traces are arranged spaced apart on the transfer board, and each of the metal traces are arranged on both the first surface and the second surface of the transfer board. The photoelectric elements are coupled to the first surface of the transfer board and axially aim to the optical fibers, respectively. The amplifiers are located on the circuit board and electrically connected to the circuit board and the photoelectric elements respectively through the metal traces.

In the foregoing, the main board has a plurality of printed traces, each of the printed traces is electrically connected to one of the metal traces and one of the amplifiers respectively through two wires.

In the foregoing, the photoelectric elements are combinations of a plurality of light emitting devices and a plurality of light detecting diodes. One of the two amplifiers is only electrically connected to the light emitting devices. Another one of the two amplifiers is only electrically connected to the light detecting diodes.

In the foregoing, the optical transceiver further comprises a plurality of metal traces. The metal traces are arranged spaced apart on the transfer board. Each of the metal traces is arranged on both the first surface and the second surface of the transfer board. The amplifiers are electrically connected to the photoelectric elements respectively through the metal traces.

In the foregoing, the optical transceiver further comprises a plurality of anti-soldering lines. The anti-soldering lines are arranged spaced apart on the transfer board and arranged in parallel between the metal traces.

In the foregoing, the amplifiers are electrically connected to the metal traces respectively through a plurality of wires.

In the foregoing, the main board has a plurality of printed traces. Each of the printed traces is electrically connected to one of the metal traces and one of the amplifiers respectively through two wires.

In the foregoing, the main board has a plurality of printed traces. Each of the printed traces is electrically connected to one of the amplifiers through a wire, and is electrically coupled to one of the metal traces directly.

In the foregoing, the main board has a plurality of printed traces. The amplifiers are respectively electrically coupled to the printed traces directly through a flip chip method, and the metal traces are respectively electrically coupled to the printed traces directly.

In the foregoing, the connection base comprises a base, at least one fixing insert, a first slot, and a second slot. The fixing insert is formed on a bottom of the base for being fixed on the main board. The first slot is located on a side of the base close to the fiber joint for inserting the transfer board into the first slot longitudinally. The second slot is located on a side of the base being away from the fiber joint communicated with the first slot for inserting the circuit board into the second slot transversely.

In the foregoing, the circuit board comprises a first block and a second block. The second block protrudes from a side of the first block. The second block is inserted into the second slot of the connection base transversely. The amplifiers are located on the second block in parallel.

In the foregoing, the second block of the circuit board contacts the connection base.

In the foregoing, the fiber joint comprises a joint body, a light signal output portion, a receiving recess, and a plurality of positioning channels. The light signal output portion is located at one end of the joint body facing towards the transfer board. The receiving recess is located at one end of the joint body opposite to the transfer board for accommodating the optical fibers. The positioning channels are arranged in the light signal output portion for respectively positioning the optical fibers so that light incident surfaces of the optical fibers axially aim to the photoelectric elements, respectively.

In the foregoing, each of the positioning channels passes through two opposite surfaces of the light signal output portion. An aperture diameter formed by the positioning channels on the surface of the light signal output portion facing towards the transfer board is smaller than an aperture diameter formed by the positioning channels on the surface of the light signal output portion being away from the transfer board.

In the foregoing, an aperture diameter of each of the positioning channels gradually narrows from the receiving recess to the light signal output portion.

In the foregoing, the fiber joint comprises a fiber gasket mounted on the receiving recess. The fiber gasket comprises a plurality of divisional islands arranged spaced apart and respectively defining a plurality of guiding slots for respectively guiding the optical fibers to the positioning channels correspondingly.

In the foregoing, two ends of each of the divisional islands respectively have a guiding camber for guiding the optical fibers to a disposition direction.

In the foregoing, the optical transceiver further comprises a lens set. The lens set comprises a lens body, a plurality of first lenses, and a plurality of second lenses. The lens body is fixed between the fiber joint and the connection base. The lens body comprises a first transceiving surface and a second transceiving surface disposed opposite to each other. The first lenses are disposed on the first transceiving surface and axially aim to the positioning channels, respectively. The second lenses are disposed on the second transceiving surface and axially aim to the first lenses and the photoelectric elements, respectively.

In the foregoing, the optical transceiver further comprises at least one guide post. The connection base has at least one first positioning hole. The lens body has at least one second positioning hole. The joint body has at least one third positioning hole. The at least one first positioning hole, the at least one second positioning hole, the at least one third positioning hole are coaxial and co-receive the at least one guide post inserted into the at least one first positioning hole, the at least one second positioning hole, and the at least one third positioning hole so that the lens set is fixed between the fiber joint and the connection base.

In the foregoing, the second surface of the transfer board is a surface of the transfer board being opposite to the main board.

In the foregoing, the second surface of the transfer board is a surface of the transfer board facing towards the main board.

In the foregoing, the photoelectric elements are a combination of light emitting devices and light detecting diodes which are arranged on the first surface of the transfer board in a matrix.

In the foregoing, one part of the metal traces electrically connecting to the light emitting devices are arranged in parallel on one part of the transfer board, and the other part of the metal traces electrically connecting to the light detecting diodes are arranged in parallel on another part of the transfer board.

In the foregoing, the optical transceiver further includes a plurality of metal linear grooves arranged in parallel between the metal traces alternately. Each of the metal linear grooves is formed on both the first surface and the second surface of the transfer board, and electrically isolated from the metal traces, one of the metal linear grooves is arranged between any two neighboring ones of the metal traces.

In the foregoing, the optical transceiver further includes a plurality of anti-soldering lines arranged on both the first surface and the second surface of the transfer board which are spaced apart and in parallel between the metal traces alternately.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

The following description uses language by referring to terms in the field of this invention. If any term is defined in the specification, such term should be explained accordingly. Besides, the terms referred to the prepositions "above", "under", "on", "onto", "in', "into", etc. in the disclosed embodiments can be directly or indirectly "above", "under" an object or a reference object and directly or indirectly "on", 'onto", "in", "into" an object or a reference object provided that these embodiments are still applicable. The mentioned "indirect" means that an intermediate object or a physical space exists between the objects. The terms referred to "adjacent", "neighboring", "between", etc. in the disclosed embodiments can be an intermediate object or a space existing between two objects or two reference objects or no intermediate object or no space existing between two objects or two reference objects provided that these embodiments are still applicable. In addition, the following description relates to an optical transceiver, and the known detail in this field will be omitted if such detail has little to do with the features of the present invention. Furthermore, the shape, size, and scale of any element in the disclosed figures are just exemplary for understanding, not for limiting the scope of this invention.

As used herein, "around," "about" or "approximately" shall generally mean within 20 percent, preferably within 10 percent, and more preferably within 5 percent of a given value or range. Numerical quantities given herein are approximate, meaning that the term "around," "about", or "approximately" can be inferred if not expressly stated.

First Embodiment

Figure 1:
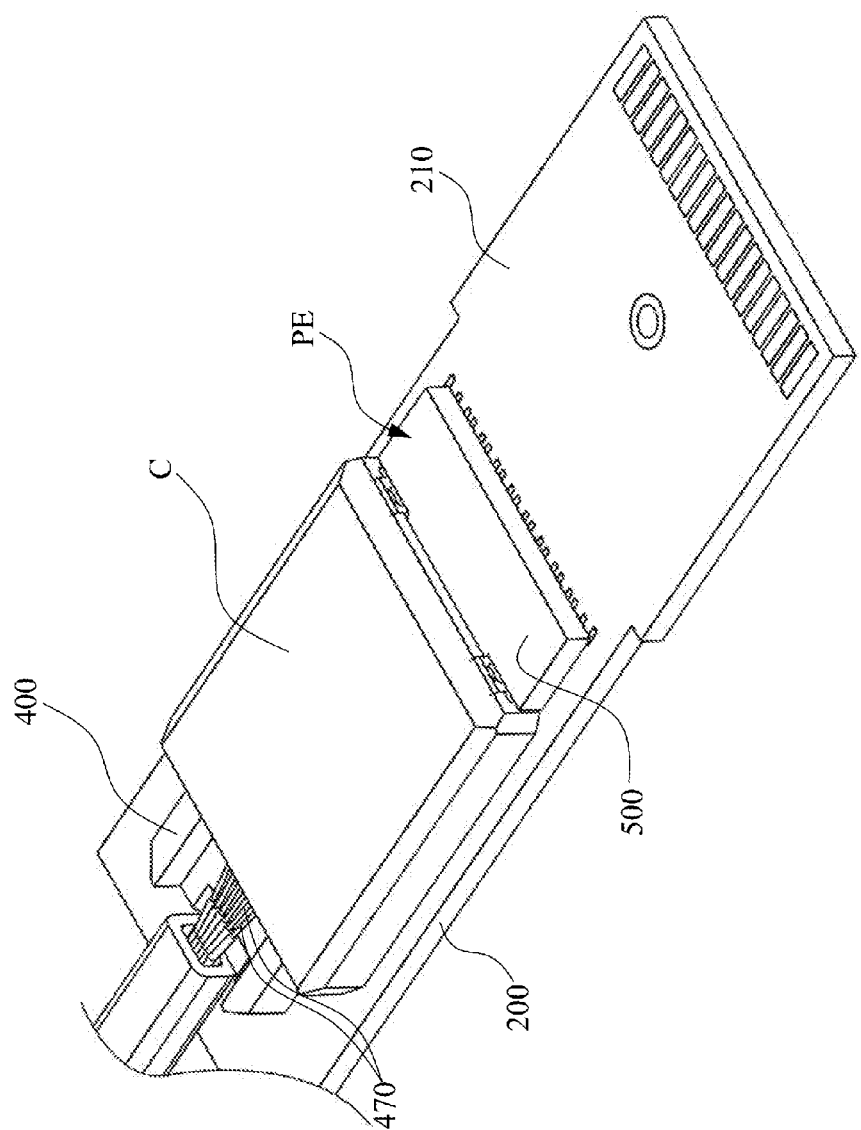
FIG. 1 depicts a perspective view of an optical transceiver according to a first embodiment of this invention.
Figure 2A:
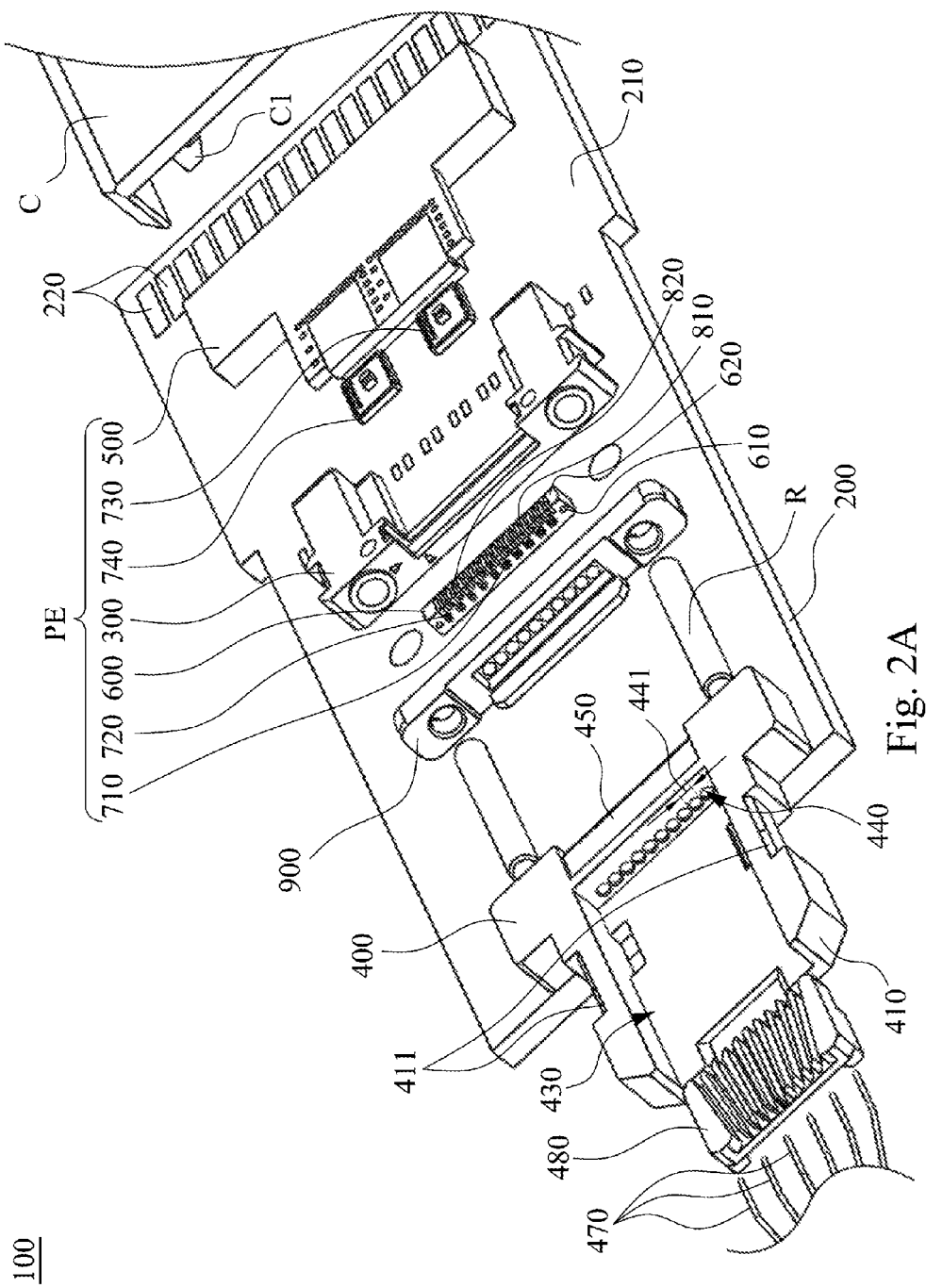
FIG. 2A is an exploded view of the optical transceiver viewed from one view angle according to the first embodiment of this invention.
Figure 2B:
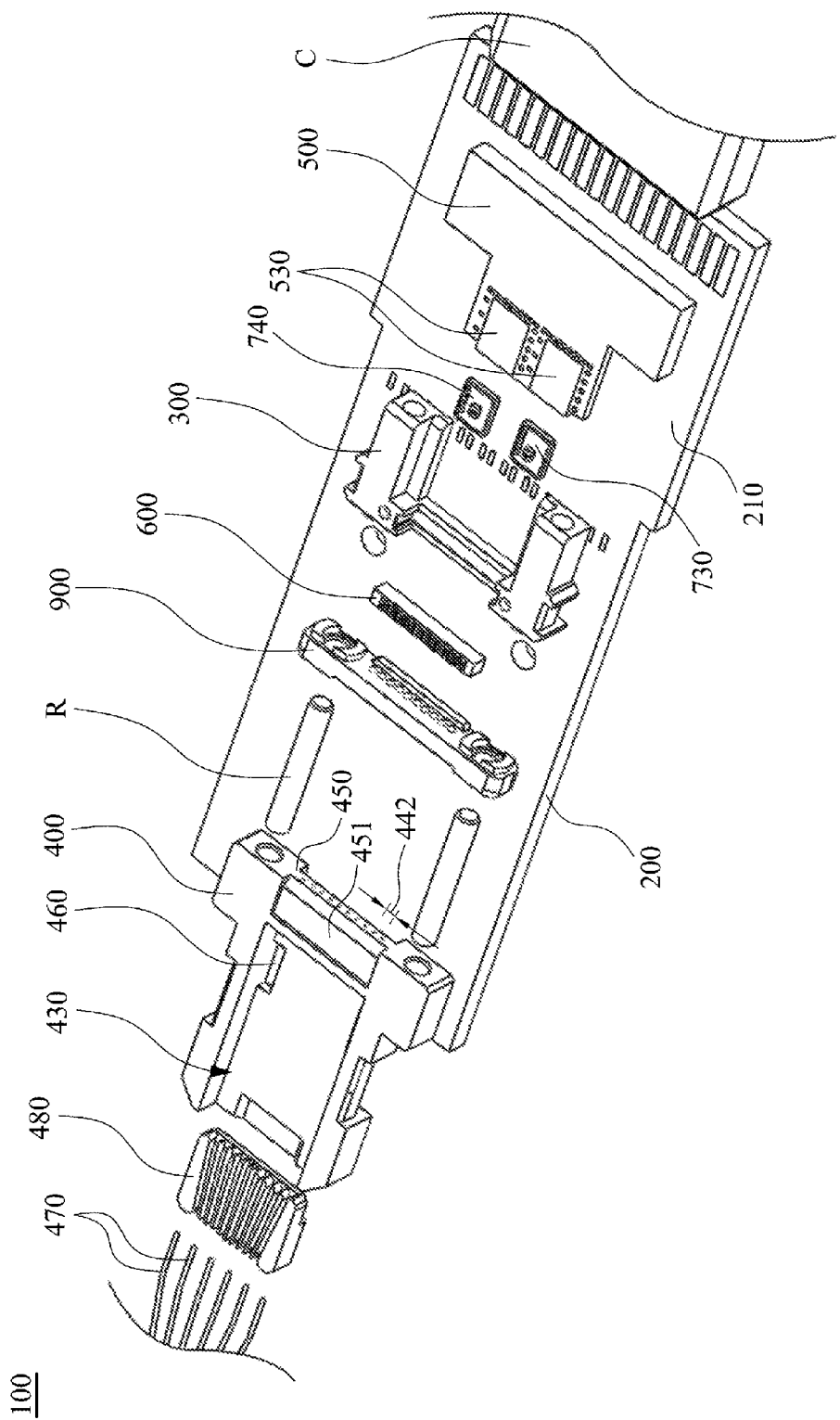
FIG. 2B is an exploded view of the optical transceiver viewed from another view angle according to the first embodiment of this invention.
Figure 3:
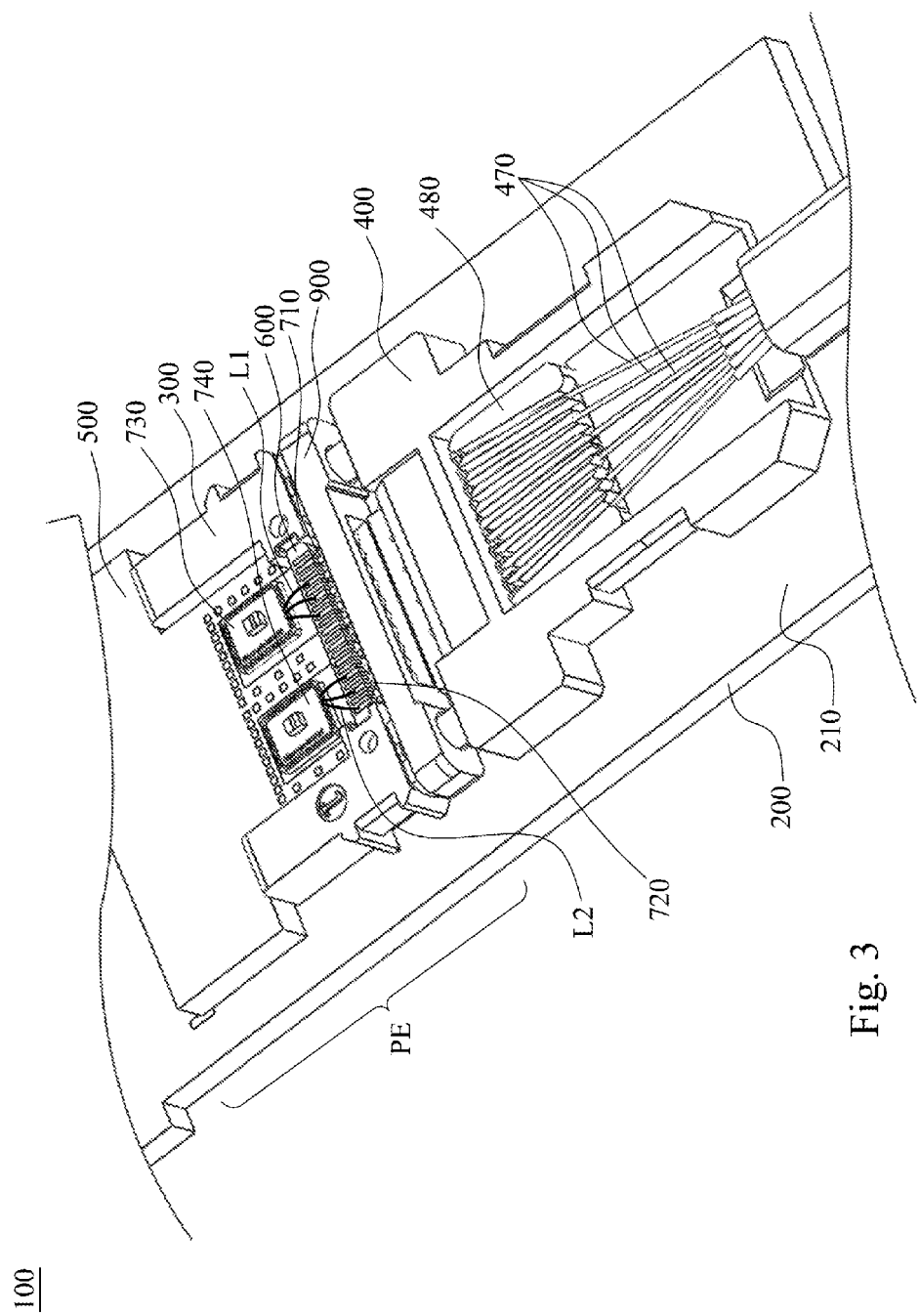
FIG. 3 depicts a perspective view of the optical transceiver after a protective cover is removed according to the first embodiment of this invention.

FIG. 1 depicts a perspective view of an optical transceiver 100 according to a first embodiment of this invention. FIG. 2A is an exploded view of the optical transceiver 100 viewed from one view angle according to the first embodiment of this invention. FIG. 2B is an exploded view of the optical transceiver 100 viewed from another view angle according to the first embodiment of this invention. FIG. 3 depicts a perspective view of the optical transceiver 100 after a protective cover C is removed according to the first embodiment or this invention.

As shown in FIG. 1 to FIG. 3, the optical transceiver 100 comprises a main board 200, a fiber joint 400, and a photoelectric module PE. The fiber joint 400 is connected to the photoelectric module PE, and both the fiber joint 400 and the photoelectric module PE are located on the main board 200.

In greater detail, the photoelectric module PE comprises a connection base 300, a circuit board 500, a transfer board 600 (i.e., a ceramic plate plated with gold on both sides thereof, or a ceramic plate plated with copper on both sides thereof), a plurality of photoelectric elements, and a plurality of amplifiers. The photoelectric elements may be, for example, light emitting devices (in the following laser or light emitting diodes 710 are taken as an example) and light detecting diodes 720. The amplifiers may be, for example, a first amplifier 730 and a second amplifier 740. The connection base 300 is coupled to a top surface 210 of the main board 200. The fiber joint 400 is coupled to the top surface 210 of the main board 200 and one side of the connection base 300 for positioning a plurality of optical fibers 470 thereon. The circuit board 500 is coupled to the top surface 210 of the main board 200 and one side of the connection base 300 opposite to the fiber joint 400. The transfer board 600 is fixed on the connection base 300 and located between the fiber joint 400 and the circuit board 500. Since a size of the main board 200 is larger than sizes of the connection base 300, the fiber joint 400, the circuit board 500, and the transfer board 600, the connection base 300, the fiber joint 400, the circuit board 500, the transfer board 600, the photoelectric elements (such as the laser or light emitting diodes 710 and the light detecting diodes 720), the amplifiers (such as the first amplifier 730 and the second amplifier 740) are all carried on the main board 200. In the present embodiment, the optical transceiver 100 may be encapsulated through molding and covered by a protective cover C so as to protect devices including the fiber joint 400 and the photoelectric module PE on the main board 200.

Hence, when the optical transceiver 100 of the first embodiment is coupled to an electrical connector of an external device (not shown in the figure), a plurality of connecting terminals 220 (such as metal contacts) of the main board 200 and connecting terminals (such as metal contacts) of the electrical connector of the external device are electrically connected to each other to allow the optical transceiver 100 of the first embodiment to exchange an electric signal with the external device.

Figure 4A:
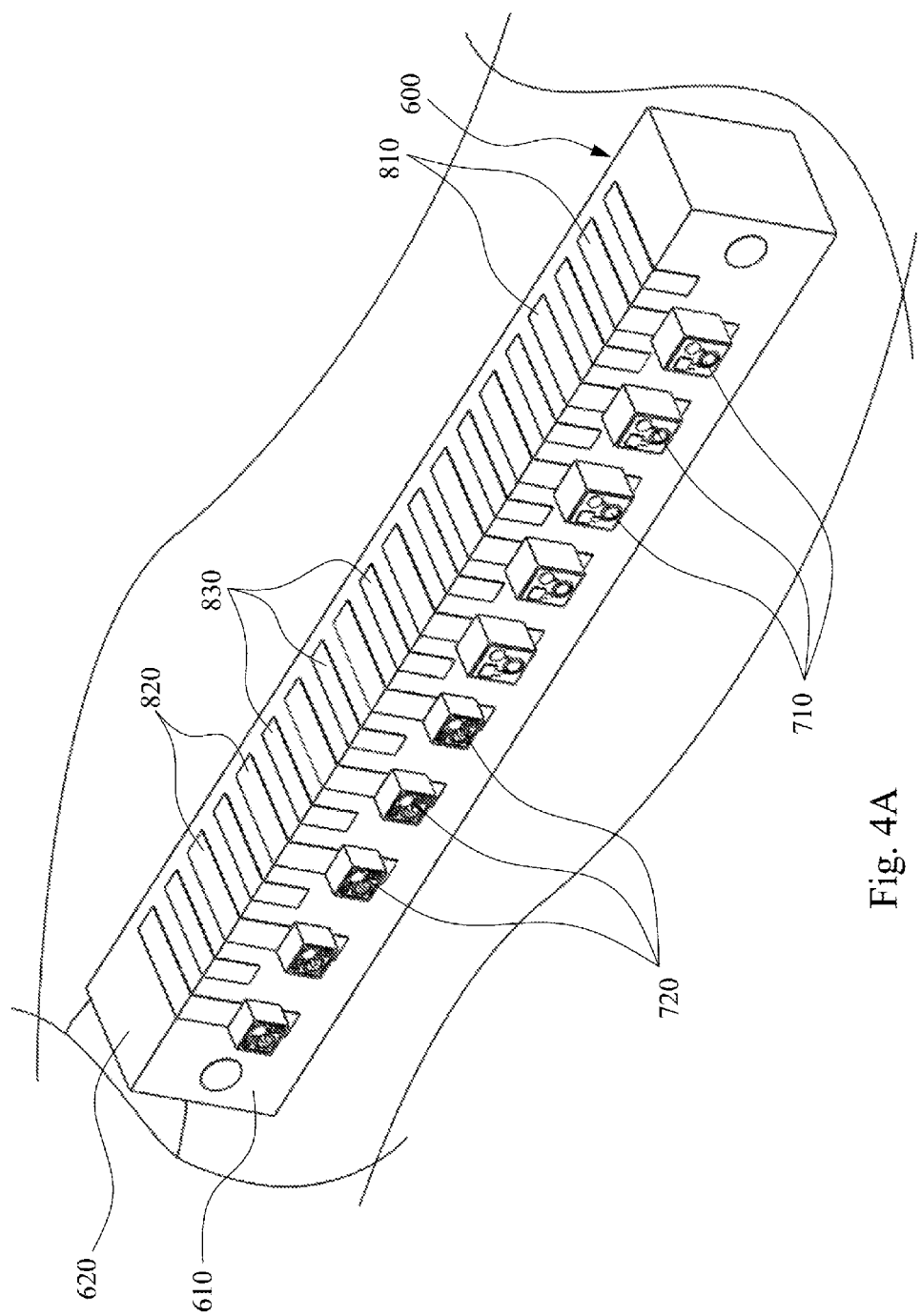
FIG. 4A depicts a partially enlarged view of a transfer board of the optical transceiver according to the first embodiment of this invention.
Figure 4B:
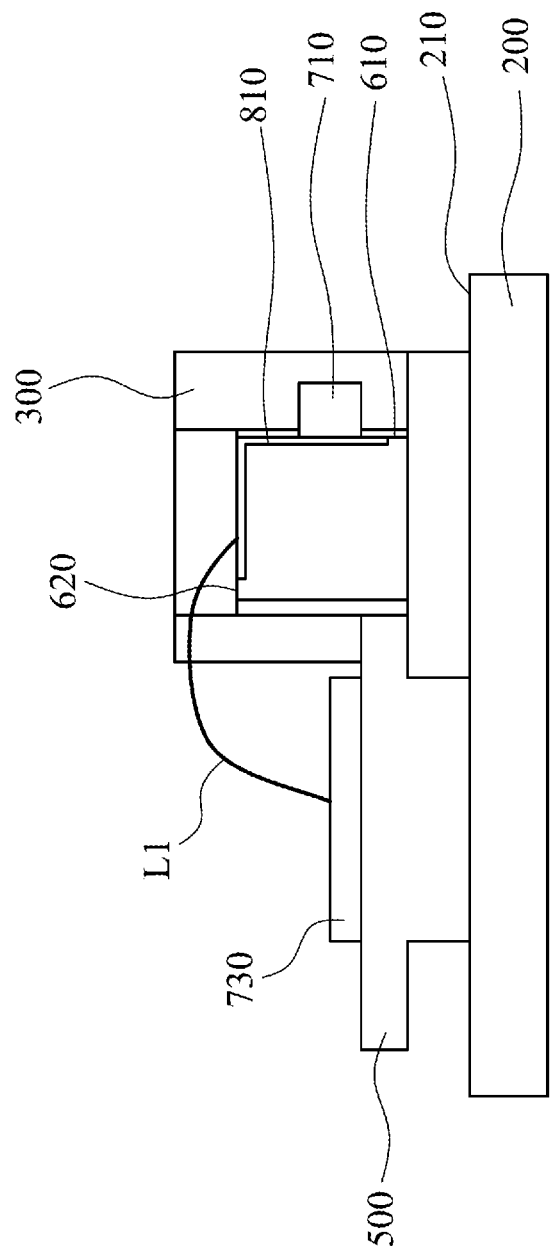
FIG. 4B depicts a cross-sectional view of a photoelectric module of the optical transceiver according to the first embodiment of this invention.

FIG. 4A depicts a partially enlarged view of the transfer board 600 of the optical transceiver 100 according to the first embodiment of this invention. FIG. 4B depicts a cross-sectional view of the photoelectric module of the optical transceiver 100 according to the first embodiment of the invention.

As shown in FIG. 4A and FIG. 4B, the transfer board 600 comprises a first surface 610 and a second surface 620 adjacent to each other. It should be understood that the adjacent first surface 610 and second surface 620 are not limited to the first surface 610 and the second surface 620 that are directly connected. However, in other embodiments of the present invention, the adjacent first surface and second surface also refer to that another inclined surface is between the first surface and the second surface of the transfer board so that the first surface and the second surface of the transfer board do not adjoin each other. The first surface 610 faces the fiber joint 400 (see FIG. 3). For example, the transfer board 600 is in a rectangular shape. The second surface 620 and the first surface 610 are approximately perpendicular to each other, and the second surface 620 is the surface of the transfer board 600 being opposite to the main board 200.

The photoelectric elements are combinations of the plurality of laser or light emitting diodes 710 and the plurality of light detecting diodes 720. Each of the laser or light emitting diodes 710 and the light detecting diodes 720 is coupled to the first surface 610 of the transfer board 600, and the laser or light emitting diodes 710 and the light detecting diodes 720 axially aim to light incident surfaces of the optical fibers 470, respectively (see FIG. 2B). However, the present invention is not limited in this regard. The laser or light emitting diodes 710 and the light detecting diodes 720 are arranged in a matrix (for example: linear) on the first surface 610 of the transfer board 600. Each of the first amplifier 730 and the second amplifier 740 is directly disposed on the circuit board 500, and electrically connects the circuit board 500 and the laser or light emitting diodes 710 or the light detecting diodes 720 (see FIG. 2B).

It should be understood that the so-called aiming axially means linear light coupling or linear light projection to the light incident surfaces (end faces) of the optical fiber 470 without being projected to the light incident surfaces (end faces) of the optical fibers 470 through a reflecting mirror surface. In other words, an optical axis of each of the photoelectric elements passes through an axial direction along which the optical fibers 470 extend.

In greater detail, as shown in FIG. 4A, the first amplifier 730 is only electrically connected to the laser or light emitting diodes 710. The second amplifier 740 is only electrically connected to the light detecting diodes 720. The laser or light emitting diodes 710 axially aim to the light incident surfaces (end faces) of one part of the optical fibers 470, respectively, for converting electric signals to light signals and outputting the light signals. The laser or light emitting diode 710 may be, for example, a laser diode or a light emitting diode (LED), and may be abbreviated to a light emitting device, but the present invention is not limited in this regard. The light detecting diodes 720 axially aim to the light incident surfaces (end faces) of the other part of the optical fibers 470, respectively, for receiving the light signals and converting the light signals to electric signals. The light detecting diode 720 is, for example, a photodiode, but the present invention is not limited in this regard.

The transfer board 600 comprises a plurality of metal traces. The metal traces are arranged on the transfer board 600, and are spaced apart in parallel. Each of the metal traces is arranged on both the first surface 610 and the second surface 620 of the transfer board 600. Both the laser or light emitting diodes 710 and the light detecting diodes 720 are disposed on the first surface 610 of the transfer board 600, and both the laser or light emitting diodes 710 and the light detecting diodes 720 are electrically coupled to partial regions of the metal traces on the first surface 610 of the transfer board 600, respectively. The amplifiers corresponding to the laser or light emitting diodes 710 and the light detecting diodes 720 are electrically connected to the photoelectric elements respectively through the metal traces so as to amplify electric signals.

The above-mentioned metal traces are combinations of a plurality of first metal traces 810 and a plurality of second metal traces 820. The first metal traces 810 are disposed on one part of the transfer board 600 and are spaced apart and in parallel, and each of the first metal traces 810 is arranged on both the first surface 610 and the second surface 620 of the transfer board 600. The laser or light emitting diodes 710 are disposed on the first surface 610 of the transfer board 600, and are respectively coupled to the first metal traces 810 on the first surface 610 of the transfer board 600. The first amplifier 730 is electrically connected to the laser or light emitting diodes 710 respectively through the first metal traces 810 and is configured for amplifying electric signals to be transmitted to the laser or light emitting diodes 710. The second metal traces 820 are disposed on another part of the transfer board 600 and are spaced apart and in parallel, and each of the second metal traces 820 is arranged on both the first surface 610 and the second surface 620 of the transfer board 600. The light detecting diodes 720 are disposed on the first surface 610 of the transfer board 600, and are respectively coupled to the second metal traces 820 on the first surface 610 of the transfer board 600. The second amplifier 740 is electrically connected to the light detecting diodes 720 respectively through the second metal traces 820 and is configured for amplifying electric signals to be transmitted from the light detecting diodes 720.

Hence, with the disposition of the metal traces (such as the first metal traces 810 and the second metal traces 820) on the first surface 610 and the second surface 620 of the transfer board 600 according to the above embodiment, a transmission distance between the photoelectric elements (such as the laser or light emitting diodes 710 and the light detecting diodes 720) and the amplifiers corresponding to the photoelectric elements is significantly reduced. As a result, when the first amplifier 730 transmits an amplified output signal to the laser or light emitting diodes 710 via the first metal traces 810, or when the light detecting diodes 720 transmit an input signal to the second amplifier 740 via the second metal traces 820, the chance that the output/input signal has a voltage drop or is interfered with noises is reduced to solve the difficulty in electric signal transmission and decrease a number of high-speed signal traces so as to reduce the probability of deterioration of the electric signals.

In the first embodiment, as shown in FIG. 4A, the above-mentioned laser or light emitting diodes 710 and light detecting diodes 720 are respectively soldered to localized regions of the first metal traces 810 and the second metal traces 820 on the first surface 610 of the transfer board 600 by using solder. In this manner, the above-mentioned laser or light emitting diodes 710 are electrically coupled to the localized regions of the first metal traces 810 on the first surface 610 of the transfer board 600 directly, and the above-mentioned light detecting diodes 720 are electrically coupled to the localized regions of the second metal traces 820 on the first surface 610 of the transfer board 600 directly.

In addition, in order to avoid that the solder crosses and is electrically connected to the neighboring first metal trace 810 or second metal trace 820, the transfer board 600 further comprises a plurality of anti-soldering lines 830. The anti-soldering lines 830 arranged on the transfer board 600 are spaced apart and are arranged in parallel between the first metal traces 810 and between the second metal traces 820 alternately.

Hence, when the above-mentioned laser or light emitting diodes 710 and light detecting diodes 720 are respectively soldered to the first metal traces 810 and the second metal traces 820, the anti-soldering lines 830 are able to block the crossing of solder so as to avoid that the neighboring first metal traces 810 or the neighboring second metal traces 820 are electrically connected to each other. The anti-soldering lines 830, the first metal traces 810, and the second metal traces 820 are made of a same material. However, the present invention is not limited in this regard. In other embodiments, the anti-soldering lines may be changed to bumps or grooves.

A description is provided with reference to FIG. 3 and FIG. 4B. In the first embodiment, the first amplifier 730 is electrically connected to the first metal traces 810 (see FIG. 4A) respectively through a plurality of first wires L1 so as to electrically connect the above-mentioned laser or light emitting diodes 710. In greater detail, the first amplifier 730 is connected to localized regions of the first metal traces 810 on the second surface 620 of the transfer board 600 respectively through the plurality of first wires L1. The second amplifier 740 is electrically connected to the second metal traces 820 (see FIG. 4A) respectively through a plurality of second wires L2 so as to electrically connect the above-mentioned light detecting diodes 720. In greater detail, the second amplifier 740 is connected to localized regions of the second metal traces 820 on the second surface 620 of the transfer board 600 respectively through the plurality of second wires L2.

However, the present invention is not limited to the above embodiment. Other variations are described in the second embodiment to the fourth embodiment as follows.

Figure 5:
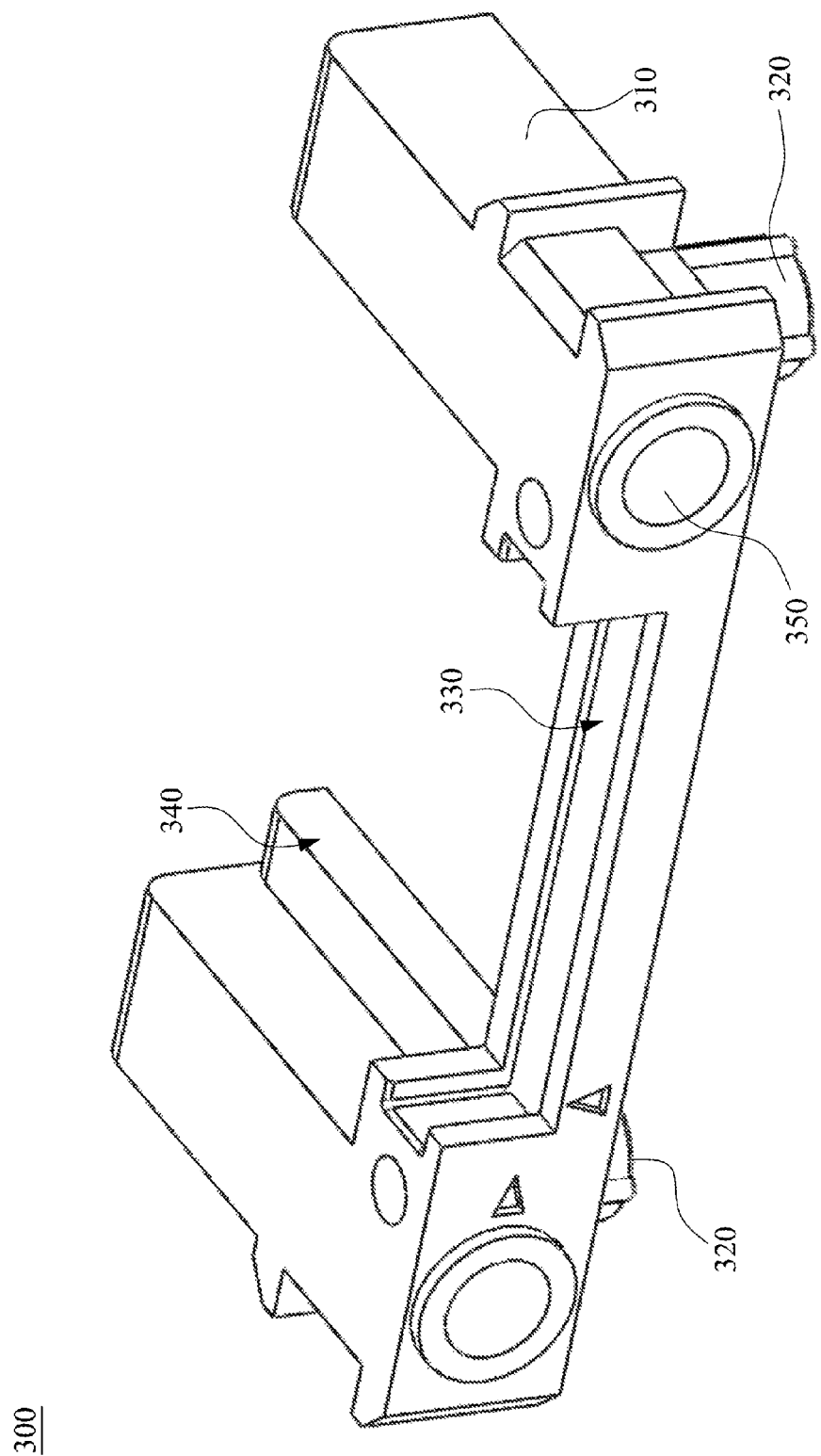
FIG. 5 depicts a perspective view of the connection base in FIG. 2.

FIG. 5 depicts a perspective view of the connection base 300 in FIG. 2. In the first embodiment, as shown in FIG. 2A and FIG. 5, the connection base 300 comprises a base 310, a plurality of fixing inserts 320, a first slot 330, and a second slot 340. There are, for example, two fixing inserts 320 located on a surface of the base 310 facing towards the main board 200 that are respectively inserted into fixing holes 230 (see FIG. 2A) of the main board 200 so that the connection base 300 is fixed on the main board 200. The first slot 330 is located on one side of the base 310, for example, located on the side of the base 310 close to the fiber joint 400. Hence, the transfer board 600 can be inserted into the first slot 330 longitudinally. That is, the transfer board 600 is inserted into the first slot 330 from the connection base 300 towards the main board 200. The second slot 340 is located on another side of the base 310, for example, located on the side of the base 310 farthest away from the fiber joint 400. Hence, the circuit board 500 can be inserted into the second slot 340 transversely. That is, the circuit board 500 is inserted into the second slot 340 from the connection base 300 towards the fiber joint 400.

Figure 6:
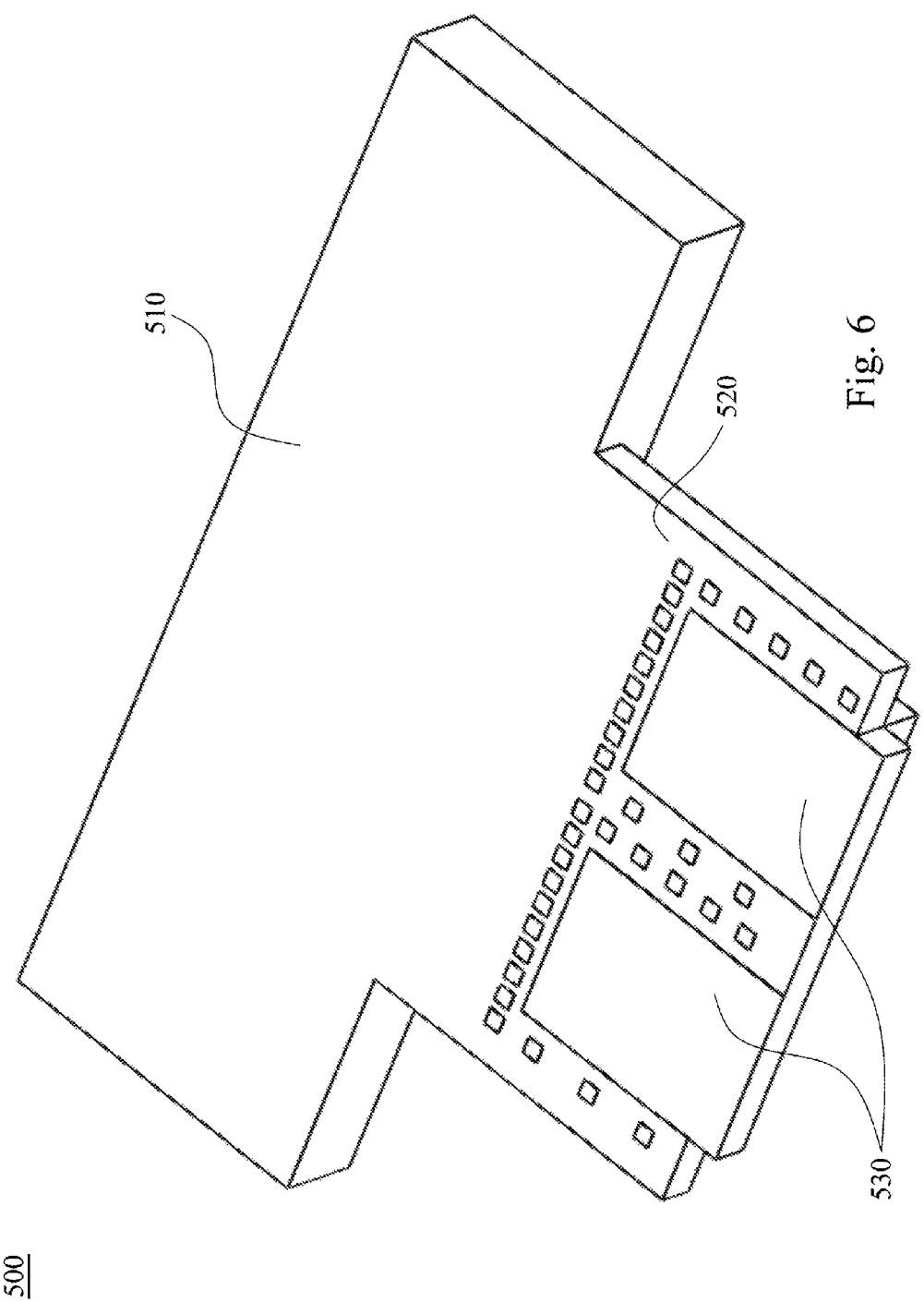
FIG. 6 depicts a perspective view of the circuit board in FIG. 2A.

FIG. 6 depicts a perspective view of the circuit board 500 in FIG. 2A. In the first embodiment, as shown in FIG. 2B and FIG. 6, the circuit board 500, being approximately in a shape of "T", comprises a first block 510 and a second block 520. The second block 520 protrudes from one side of the first block 510 to allow the second block 520 to be inserted into the second slot 340 (see FIG. 5) of the above-mentioned connection base 300 transversely. Two chip areas 530 are disposed at an end of the second block 520 farthest away from the first block 510 to allow the first amplifier 730 and the second amplifier 740 to be placed on the two chip areas 530 (see FIG. 2B) in parallel. In addition, part of the two chip areas 530 may extend towards the first slot 330 so that the second block 520 is as close to the connection base 300 as possible or contacts the connection base 300. In this manner, the transmission distance between the photoelectric elements (that is, the light emitting devices and the light detecting diodes) and the amplifiers corresponding to the photoelectric elements is significantly reduced to reduce the chance that the output/input signal has a voltage drop or is interfered with noises. As a result, the probability that the electric signals deteriorate is reduced. Additionally, since the second slot 340 exposes the top surface 210 of the main board 200 (see FIG. 2A), the circuit board 500 is still allowed to be electrically coupled to the top surface 210 of the main board 200 directly after being inserted into the second slot 340 so as to electrically connect the above-mentioned connecting terminals 220 (see FIG. 1).

Figure 7:
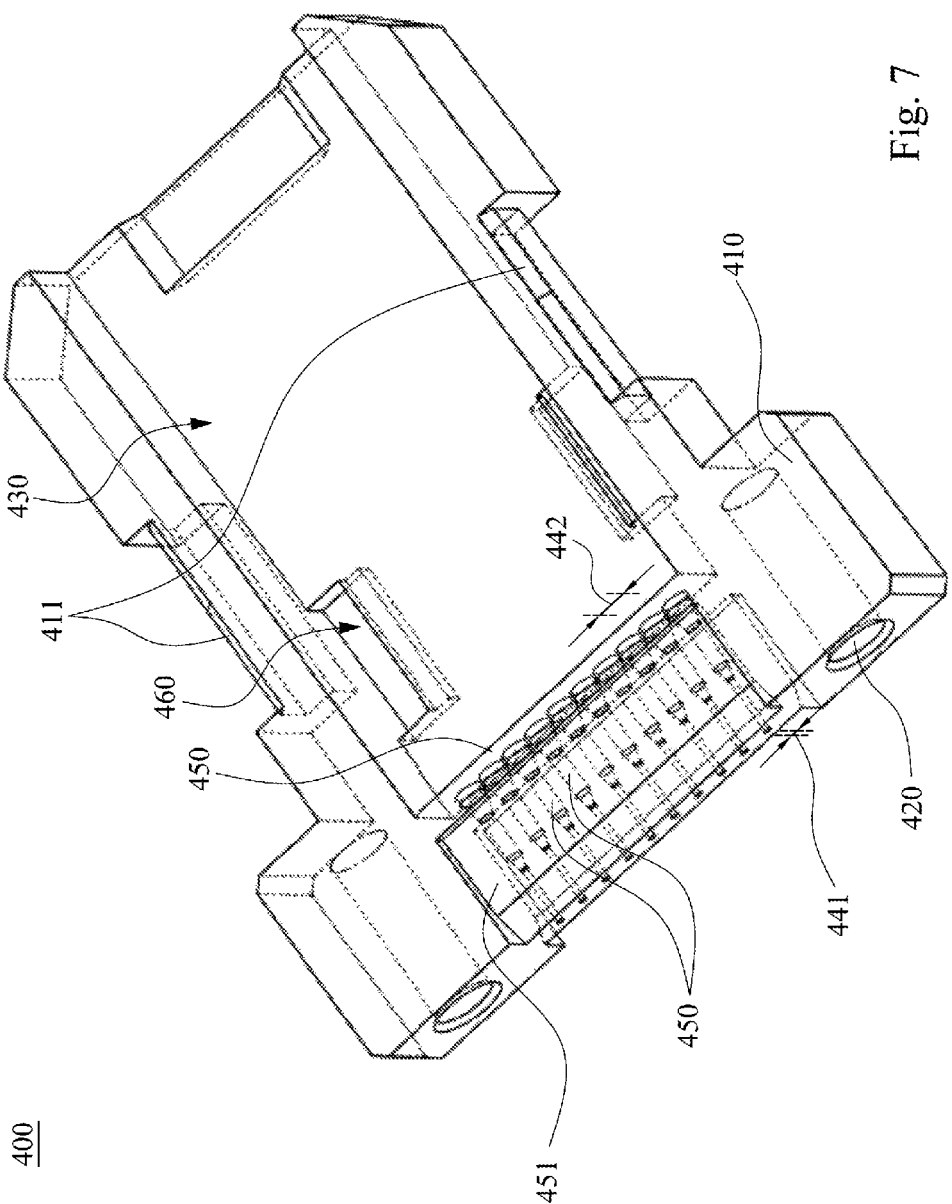
FIG. 7 depicts a perspective view of the fiber joint viewed from the optical fibers in FIG. 2A.

FIG. 7 depicts a perspective view of the fiber joint viewed from the optical fibers in FIG. 2A. In the first embodiment, as shown in FIG. 2A and FIG. 7, the fiber joint 400 comprises a joint body 410, a receiving recess 430, and a plurality of positioning channels 440. The receiving recess 430 is depressed on a top surface of the joint body 410 for accommodating the above-mentioned optical fibers 470. One end of the joint body 410, that is the end of the joint body 410 facing towards the transfer board 600, has a light signal output portion 450.

The positioning channels 440 are arranged in the light signal output portion 450 in a linear matrix manner. The optical fibers 470 are respectively positioned in the positioning channels 440. In greater detail, all the positioning channels 440 pass through two opposite surfaces of the light signal output portion 450. An aperture diameter 441 formed by the positioning channels 440 on the surface of the light signal output portion 450 facing towards the transfer board 600 is smaller than an aperture diameter 442 formed by the positioning channels 440 on the surface of the light signal output portion 450 facing away from the transfer board 600 (see FIG. 7). In addition, two opposite outer sides of the joint body 401 comprise a plurality of snap slots 411. The snap slots 411 are configured for engaging snap fasteners C1 of the protective cover C in the snap slots 411.

As shown in FIG. 2A, since the positioning channels 440 axially aim to the photoelectric elements (that is, the light detecting diodes 720 and the laser or light emitting diodes 710), respectively, and the optical fibers 470 respectively pass through apertures of the positioning channels 440 facing towards the transfer board 600 and are then cut, the light incident surfaces (end faces) of the optical fibers 470 evenly emerge at the apertures formed by the positioning channels 440 on the surface of the light signal output portion 450 facing towards the transfer board 600 so that the light incident surfaces (end faces) of the optical fibers 470 axially aim to the photoelectric elements (that is, the light detecting diodes 720 and the laser or light emitting diodes 710), respectively.

It is understood that, when laser is utilized to evenly cut the optical fibers 470 passing through the apertures of the positioning channels 440 facing towards the transfer board 600, the laser needs to be tilted at a specific angle before the optical fibers 470 can be severed. Hence, two chamfers 451 opposite to each other are disposed on the light signal output portion 450 to prevent the laser from touching the light signal output portion 450 that causes charring.

In practices, as shown in FIG. 7, an aperture diameter of each of the positioning channels 440 gradually narrows from the receiving recess 430 to the light signal output portion 450. Because the aperture diameter 442 of the positioning channels 440 on the surface of the light signal output portion 450 facing away from the transfer board 600 is larger than the aperture diameter 441 of the positioning channels 440 on the surface of the light signal output portion 450 facing towards the transfer board 600, rapid insertion of the optical fibers 470 into the positioning channels 440 is facilitated and the optical fibers 470 are positioned in the positioning channels 440.

Figure 8:
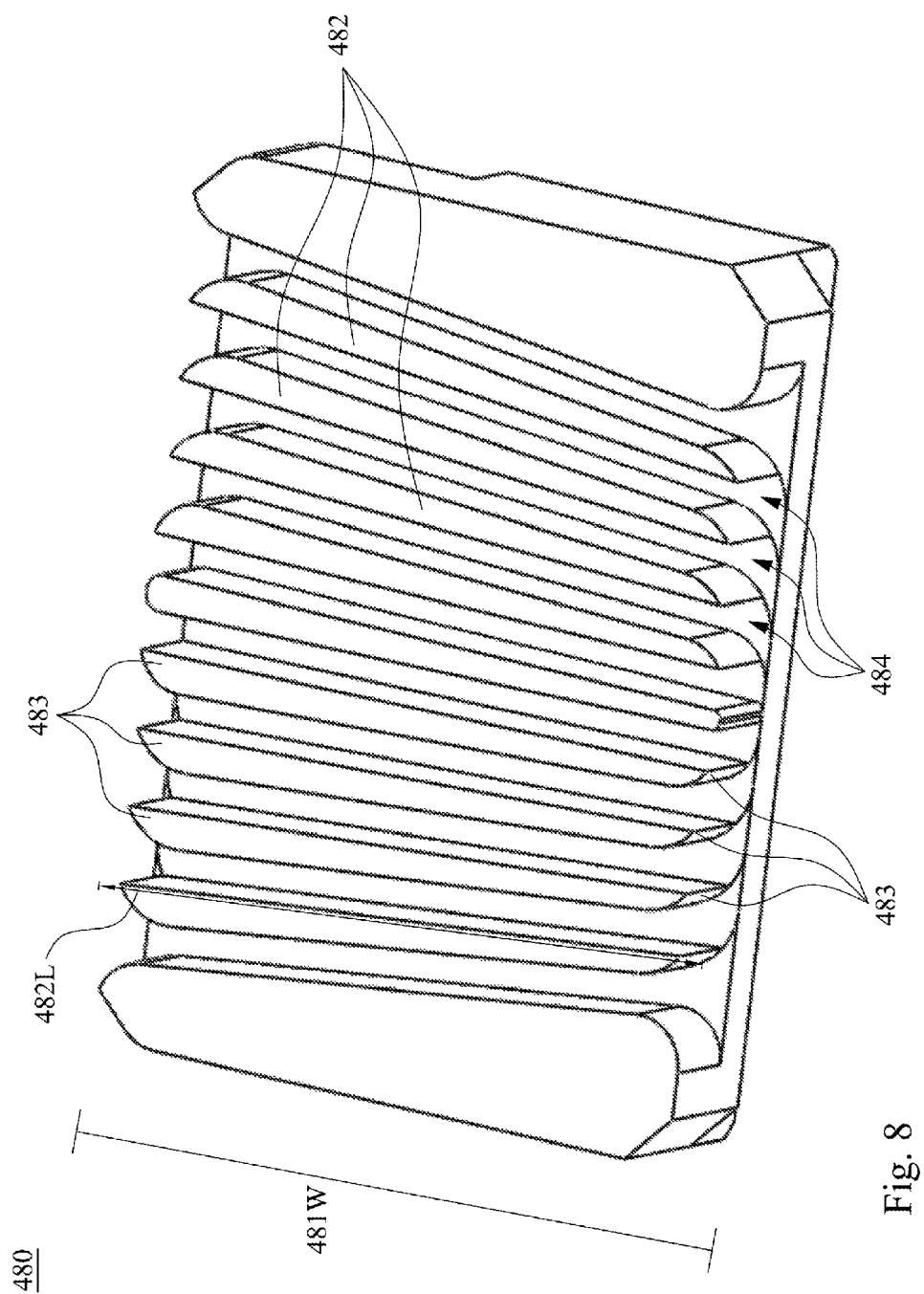
FIG. 8 depicts a perspective view a fiber gasket in FIG. 2A.
Figure 9:
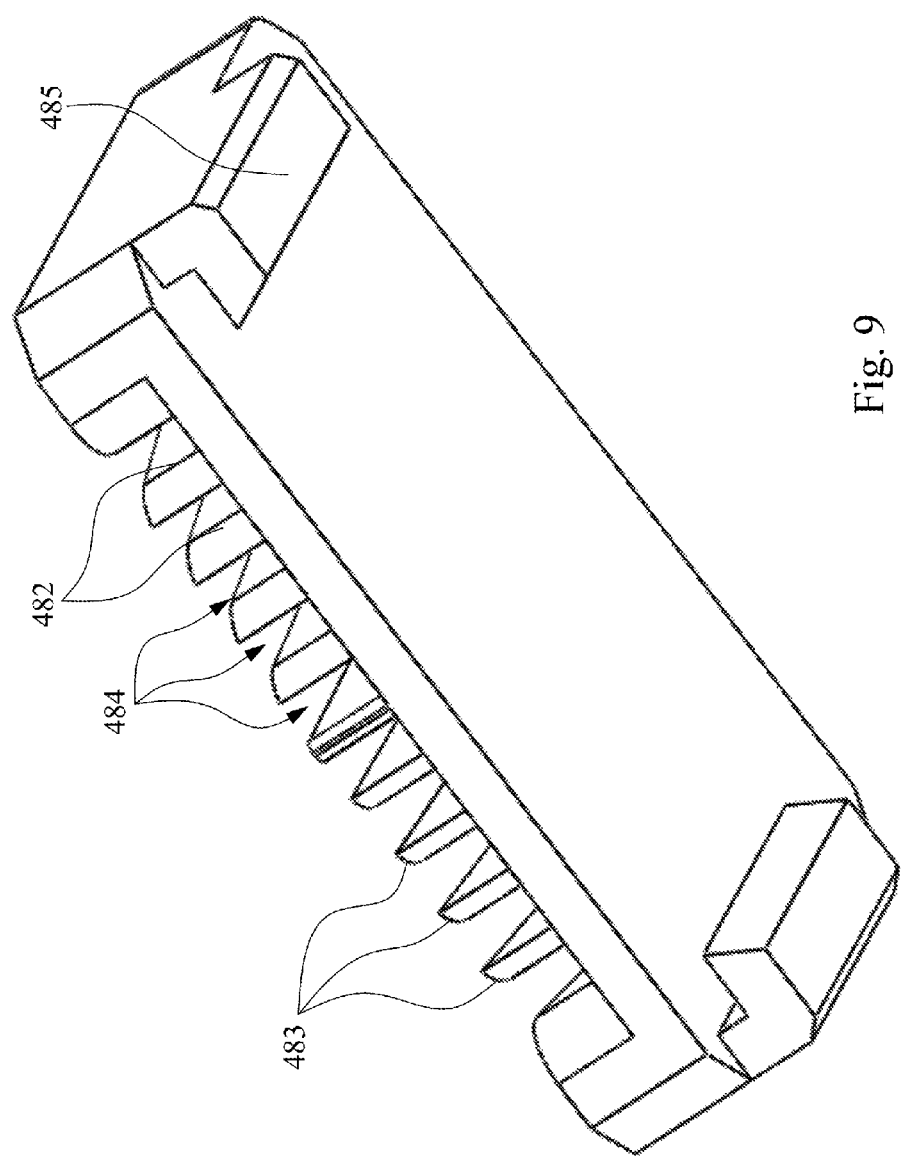
FIG. 9 depicts a perspective view of the fiber gasket in FIG. 2A viewed from bottom of the fiber pad.

FIG. 8 depicts a perspective view a fiber gasket 480 in FIG. 2A. FIG. 9 depicts a perspective view of the fiber gasket 480 in FIG. 2A viewed from bottom of the fiber gasket 480. As shown in FIG. 8 and FIG. 9, the fiber joint 400 further comprises a fiber gasket 480. The fiber gasket 480 is mounted on the receiving recess 430. In greater detail, as shown in FIG. 9, the fiber gasket 480 comprises a sheet body 481 and two opposite mounting ribs 485. The mounting ribs 485 are located on a bottom surface of the sheet body 481 and are configured for inserting into two opposite mounting slots 460 (see FIG. 2B) on a top surface of the joint body 410 to allow the fiber gasket 480 to be fixed on the joint body 410.

In greater detail, the fiber gasket 480 further comprises a plurality of divisional islands 482. The divisional islands 482 are arranged spaced apart on a top surface of the sheet body 481 and respectively define a plurality of guiding slots 484. The guiding slots 484 are used for completely separating the optical fibers 470 and respectively guiding the optical fibers 470 to the positioning channels 440 correspondingly. A length 482L of the divisional islands 482 is approximately the same as a width 481W of the top surface of the sheet body 481 so as to separate the optical fibers 470 to the corresponding positioning channels 440 effectively. Additionally, two ends of each of the divisional islands 482 respectively have a guiding camber 483. The guiding cambers 483 further facilitate the guidance of the optical fibers 470 to the disposition direction and avoid fractures of the optical fibers 470.

Figure 10:
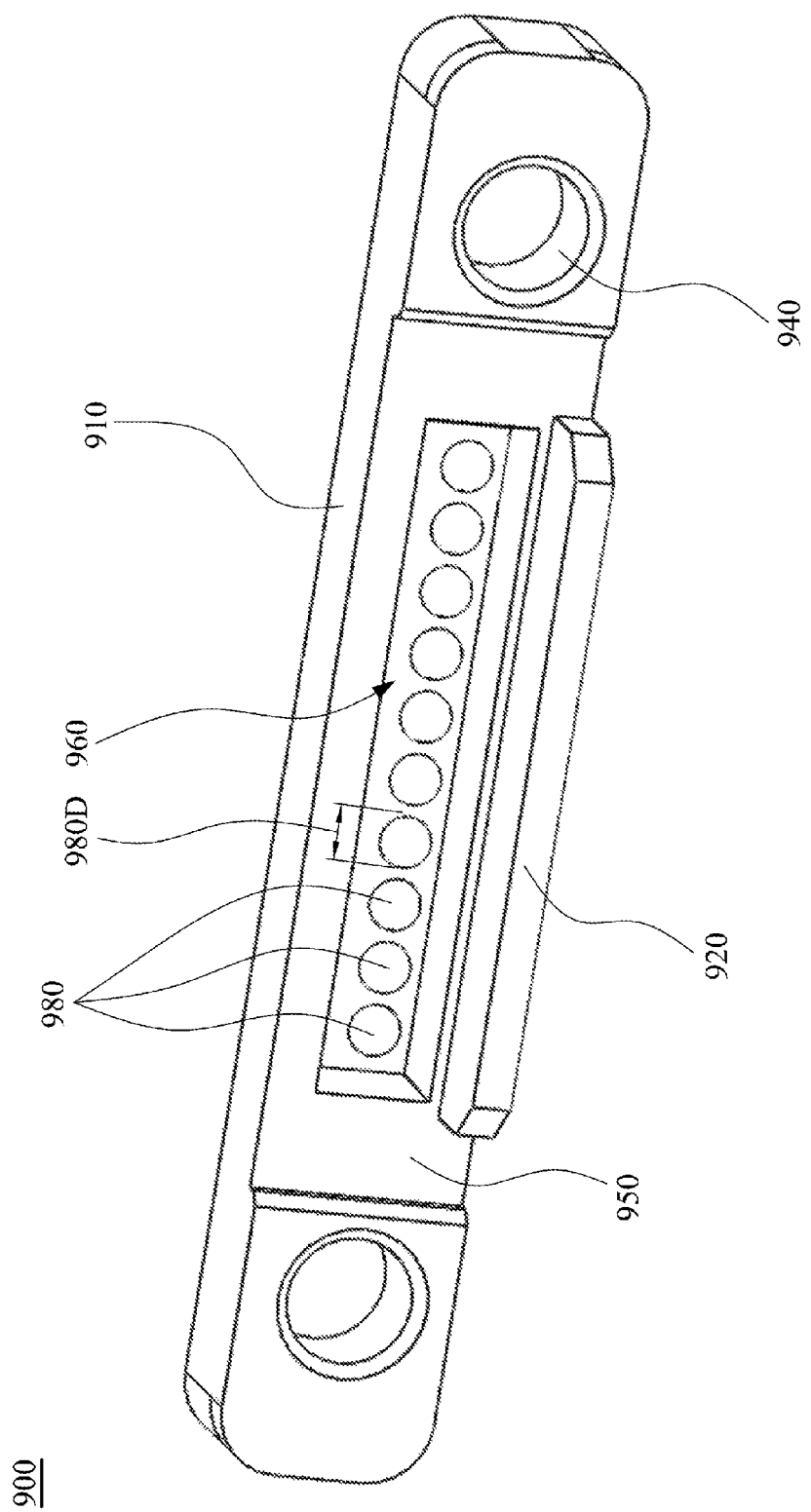
FIG. 10 depicts a perspective view of a lens set viewed from the optical fibers in FIG. 2A.
Figure 11:
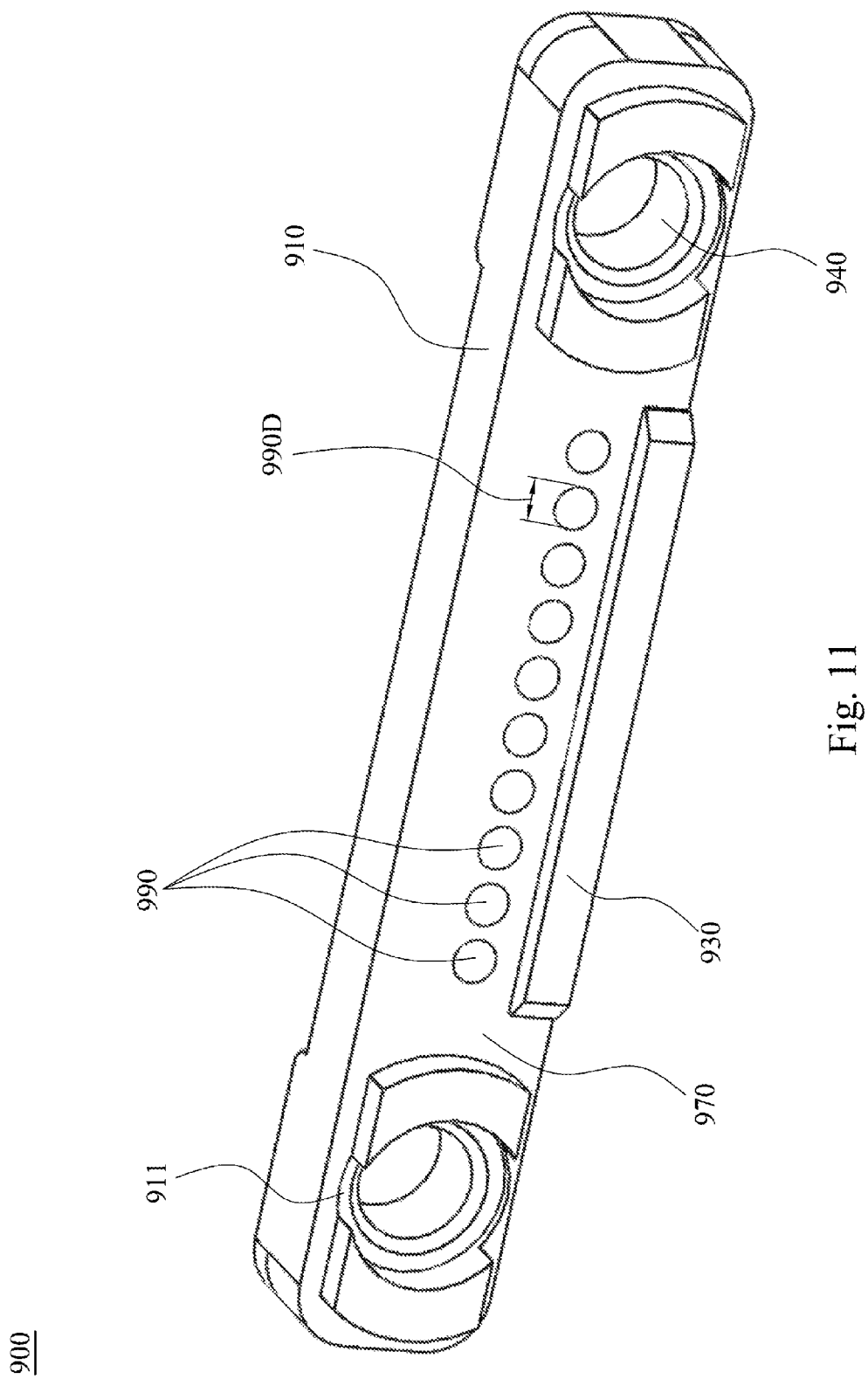
FIG. 11 depicts a perspective view of the lens set viewed from the transfer board in FIG. 2A.

FIG. 10 depicts a perspective view of a lens set 900 viewed from the optical fibers 470 in FIG. 2A. FIG. 11 depicts a perspective view of the lens set 900 viewed from the transfer board 600 in FIG. 2A.

In addition, as shown in FIG. 10 and FIG. 11, the optical transceiver 100 further comprises a lens set 900 according to the first embodiment. The lens set 900 comprises a lens body 910, a plurality of first lenses 980, and a plurality of second lenses 990. The lens body 910 is fixed between the fiber joint 400 and the connection base 300. The lens body 910 comprises a first transceiving surface 950 and a second transceiving surface 970 opposite to each other. The first lenses 980 are disposed on the first transceiving surface 950, and the second lenses 990 are disposed on the second transceiving surface 970. A diameter 980D of the first lenses 980 is smaller than a diameter 990D of the second lenses 990. As shown in FIG. 2A and FIG. 2B, the first lenses 980 axially aim to the positioning channels 440, respectively. Additionally, the second lenses 990 are disposed on the second transceiving surface 970 and axially aim to the first lenses 980 and the photoelectric elements (that is, the light detecting diodes 720 and the laser or light emitting diodes 710), respectively. The first lenses 980 or/and the second lenses 990 may be spherical lenses or aspherical lenses, but the present invention is not limited in this regard.

In greater detail, the first transceiving surface 950 has a recessed groove 960. The first lenses are arranged on a bottom of the recessed groove 960.

The lens body 910 further comprises a first spacing rib 920 and a second spacing rib 930 having a different size from each other. The first spacing rib 920, being larger than the second spacing rib 930, is located on the first transceiving surface 950 and abuts against the fiber joint 400. Hence, with the functions of the first spacing rib 920 and the recessed groove 960, an expected distance between the light signal output portion 450 and the first lenses 980 is ensured so as to maintain a focal length that the first lenses 980 should have relative to the optical fibers 470. The second spacing rib 930 is located on the second transceiving surface 970 and abuts against a surface of the connection base 300 facing towards the fiber joint 400. Hence, with the function of the second spacing rib 930, an expected distance between the photoelectric elements (that is, the laser or light emitting diodes 710 and the light detecting diodes 720) on the first surface 610 of the transfer board 600 and the second lenses 990 is ensured so as to maintain a focal length that the second lenses 990 should have relative to the above photoelectric elements.

With additional reference to FIG. 2A, two opposite sides of the base 310 of the connection base 300 have two first positioning holes 350. Two opposite sides of the lens body 910 of the lens set 900 have two second positioning holes 940. Two opposite sides of the joint body 410 of the fiber joint 400 have two third positioning holes 420. The first positioning hole 350, the second positioning hole 940, and the third positioning hole 420 on the same side are coaxial and co-receive a positioning guide post R (such as a high precision guide post) inserted into them so that the lens set 900 is fixed between the fiber joint 400 and the connection base 300.

Therefore, when a user assembles the optical transceiver 100 of the embodiment, the user assembles the connection base 300 to the main board 200, assembles the transfer board 600 and the circuit board 500 to the connection base 300, and positions the lens set 900 and the fiber joint 400 onto the connection base 300 by utilizing the above method. An encapsulation portion (not shown in the figure) is then covered on the fiber joint 400, the circuit board 500, the connection base 300, the transfer board 600, the photoelectric elements (such as the laser or light emitting diodes 710 and the light detecting diodes 720), the first amplifier 730, the second amplifier 740, and the main board 200. The fiber joint 400, the circuit board 500, the connection base 300, the transfer board 600, the laser or light emitting diodes 710, the light detecting diodes 720, the first amplifier 730, and the second amplifier 740 are thus packaged on the main board 200 to protect the optical fibers 470 on the fiber joint 400, the first metal traces 810 and the second metal traces 820 on the transfer board 600.

In addition, as shown in FIG. 3, when the lens set 900 is assembled between the fiber joint 400 and the connection base 300, the two opposite sides of the lens body 910 adjacent to the second positioning holes 940 and the connection base 300 respectively define a gap 911. Each of the gaps 911 is communicated with the second positioning hole 940 and exposes one of the positioning guide posts R to allow a fixing adhesive to be applied to the first positioning hole 350, the second positioning hole 940, and the third positioning hole 420 on the same side via the gap 911. As a result, the positioning guide posts R are fixed in the lens set 900, the fiber joint 400, and the connection base 300.

Second Embodiment

Figure 12:
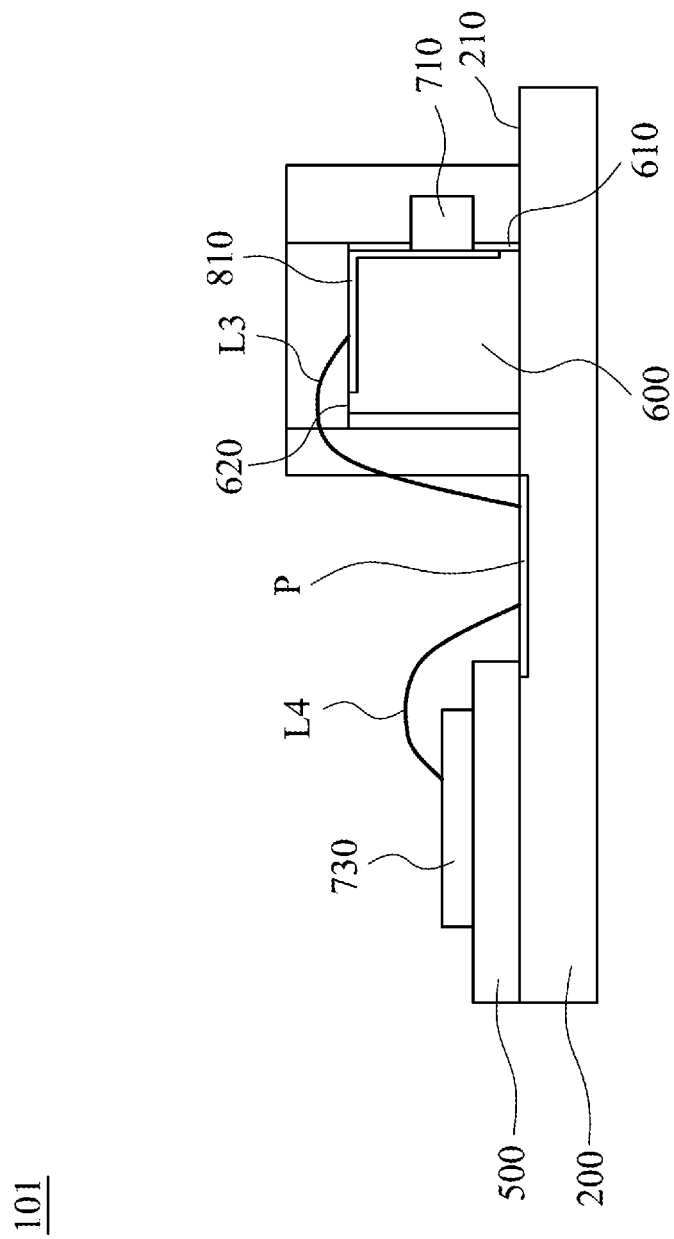
FIG. 12 depicts a cross-sectional view of a photoelectric module of an optical transceiver according to a second embodiment of this invention.

FIG. 12 depicts a cross-sectional view of a photoelectric module of an optical transceiver according to a second embodiment of this invention. As shown in FIG. 12, an optical transceiver 101 of the second embodiment is approximately the same as the optical transceiver 100 in FIG. 3. The only difference is that the main board 200 further has a plurality of printed traces P on the main board 200. Each of the printed traces P is electrically connected to the first metal trace 810 (or the second metal trace) and the first amplifier 730 (or the second amplifier) through a third wire L3 and a fourth wire L4, respectively. In greater detail, each of the printed traces P is printed on the top surface of the main board 200 and is between the circuit board 500 and the laser or light emitting diode 710. Each of the printed traces P is connected to the first amplifier 730 (or the second amplifier) through the fourth wire L4 and is connected to the localized region of the first metal trace 810 (or the second metal trace) on the second surface 620 of the transfer board 600 through the third wire L3.

Third Embodiment

Figure 13:
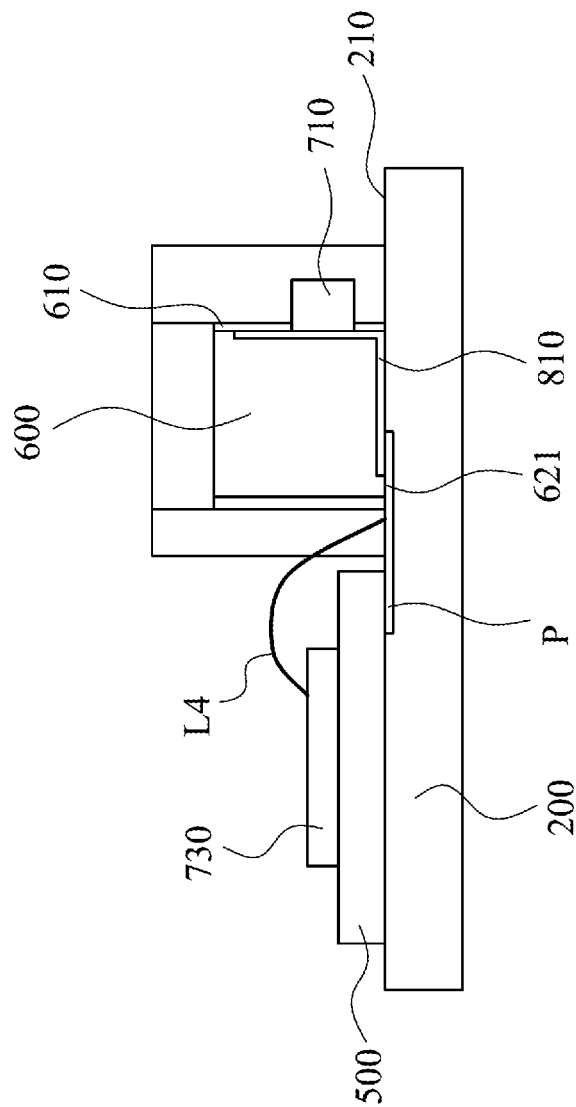
FIG. 13 depicts a cross-sectional view of a photoelectric module of an optical transceiver according to a third embodiment of this invention.

FIG. 13 depicts a cross-sectional view of a photoelectric module of an optical transceiver according to a third embodiment of this invention. As shown in FIG. 13, an optical transceiver 102 of the third embodiment is approximately the same as the optical transceiver 101 in FIG. 12. The only difference is that a second surface 621 of the transfer board 600 is on a surface of the transfer board 600 rightly facing towards the main board 200 rather than on the surface of the transfer board 600 facing away from the main board 200. Each of the printed traces P on the top surface 210 of the main board 200 is electrically couple to the first metal trace 810 (or the second metal trace) directly, and is connected to a localized region of the first metal trace 810 on the second surface 621 of the transfer board 600.

Fourth Embodiment

Figure 14:
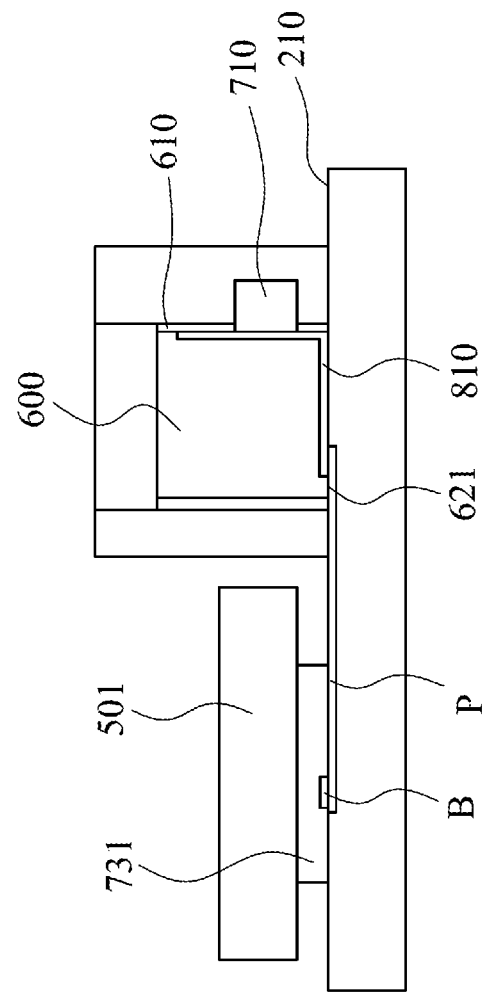
FIG. 14 depicts a cross-sectional view of a photoelectric module of an optical transceiver according to a fourth embodiment of this invention.

FIG. 14 depicts a cross-sectional view of a photoelectric module of an optical transceiver according to a fourth embodiment of this invention. As shown in FIG. 14, an optical transceiver 103 of the fourth embodiment is approximately the same as the optical transceiver 102 in FIG. 13. The only difference is that the first amplifier 730 or/and the second amplifier 740 is not electrically connected to the printed trace P through wire bonding. Rather, the first amplifier 730 or/and the second amplifier 740 is electrically coupled to the printed traces P on the top surface 210 of the main board 200 through a flip chip method, which means a vertically reversed circuit board 501 is electrically coupled to the printed trace P on the top surface 210 of the main board 200 directly through an electrode contact B of the first amplifier 730 or/and the second amplifier 740 facing downward.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical transceiver comprising:
   a main board;
   a connection base coupled to one surface of the main board, the connection base comprising a base body; at least one fixing insert formed on a bottom of the base body for inserting on the main board; a first slot located on a side of the base body; and a second slot located on another side of the base body communicated with the first slot;
   a fiber joint coupled to the surface of the main board and the side of the base body for positioning a plurality of optical fibers;
   a circuit board inserting into the second slot transversely, coupled to the surface of the main board, and electrically connected to the main board;
   a transfer board inserted into the first slot longitudinally, and located between the fiber joint and the circuit board, the transfer board comprising a first surface and a second surface adjacent to each other, and the first surface facing towards the fiber joint;
   a plurality of metal traces arranged spaced apart on the transfer board, each of the metal traces being arranged on both the first surface and the second surface of the transfer board;
   a plurality of photoelectric elements coupled to the first surface of the transfer board and axially aiming to the optical fibers, respectively; and
   two amplifiers located on the circuit board and electrically connected to the circuit board and the photoelectric elements respectively through the metal traces.

2. The optical transceiver of claim 1, wherein the main board has a plurality of printed traces, each of the printed traces is electrically connected to one of the metal traces and one of the amplifiers respectively through two wires.

3. The optical transceiver of claim 1, wherein the main board has a plurality of printed traces, each of the printed traces is electrically connected to one of the amplifiers through a wire, and is electrically coupled to one of the metal traces directly.

4. The optical transceiver of claim 1, wherein the main board has a plurality of printed traces, the amplifiers are respectively electrically coupled to the printed traces directly through a flip chip method, and the metal traces are respectively electrically coupled to the printed traces directly.

5. The optical transceiver of claim 1, wherein the circuit board comprises a first block and a second block, the second block protrudes from a side of the first block, the second block is inserted into the second slot of the connection base transversely, the amplifiers are located on the second block in parallel.

6. The optical transceiver of claim 5, wherein the second block of the circuit board contacts an inner surface of the second slot.

7. The optical transceiver of claim 1, wherein the fiber joint comprises:
   a joint body;
   a light signal output portion located at one end of the joint body facing towards the transfer board;
   a receiving recess located at one end of the joint body being opposite to the transfer board for accommodating the optical fibers; and
   a plurality of positioning channels arranged in the light signal output portion for respectively positioning the optical fibers so that light incident surfaces of the optical fibers axially aim to the photoelectric elements, respectively.

8. The optical transceiver of claim 7, wherein each of the positioning channels passes through two opposite surfaces of the light signal output portion, an aperture diameter formed by the positioning channels on the surface of the light signal output portion facing towards the transfer board is smaller than an aperture diameter formed by the positioning channels on the surface of the light signal output portion facing away from the transfer board.

9. The optical transceiver of claim 8, wherein an aperture diameter of each of the positioning channels gradually narrows from the receiving recess to the light signal output portion.

10. The optical transceiver of claim 7, wherein the fiber joint comprises:
   a fiber gasket mounted on the receiving recess, the fiber gasket comprising a plurality of divisional islands arranged spaced apart and respectively defining a plurality of guiding slots for respectively guiding the optical fibers to the positioning channels correspondingly.

11. The optical transceiver of claim 10, wherein two ends of each of the divisional islands respectively have a guiding camber for guiding the optical fibers to a disposition direction.

12. The optical transceiver of claim 7, further comprising:
a lens set comprising:
a lens body fixed between the fiber joint and the connection base, the lens body comprising a first transceiving surface and a second transceiving surface disposed opposite to each other;
a plurality of first lenses disposed on the first transceiving surface axially aiming to the positioning channels, respectively; and
a plurality of second lenses disposed on the second transceiving surface axially aiming to the first lenses and the photoelectric elements, respectively.

13. The optical transceiver of claim 12, further comprising at least one guide post, the connection base having at least one first positioning hole, the lens body having at least one second positioning hole, the joint body having at least one third positioning hole;
wherein the at least one first positioning hole, the at least one second positioning hole, the at least one third positioning hole are coaxial and co-receive the at least one guide post inserted into the at least one first positioning hole, the at least one second positioning hole, and the at least one third positioning hole so that the lens set is fixed between the fiber joint and the connection base.

14. The optical transceiver of claim 1, wherein the second surface of the transfer board is a surface of the transfer board being opposite to the main board.

15. The optical transceiver of claim 1, wherein the second surface of the transfer board is a surface of the transfer board facing towards the main board.

16. The optical transceiver of claim 1, wherein the photoelectric elements are a combination of light emitting devices and light detecting diodes which are arranged on the first surface of the transfer board in a matrix.

17. The optical transceiver of claim 16, wherein one part of the metal traces electrically connecting to the light emitting devices are arranged in parallel on one part of the transfer board, and the other part of the metal traces electrically connecting to the light detecting diodes are arranged in parallel on another part of the transfer board.

18. The optical transceiver of claim 1, further comprising:
a plurality of metal linear grooves arranged in parallel between the metal traces alternately, wherein each of the metal linear grooves is formed on both the first surface and the second surface of the transfer board, and electrically isolated from the metal traces, one of the metal linear grooves is arranged between any two neighboring ones of the metal traces.

19. The optical transceiver of claim 1, further comprising:
a plurality of anti-soldering lines arranged on both the first surface and the second surface of the transfer board which are spaced apart and in parallel between the metal traces alternately.

* * * * *